UNITED STATES PATENT OFFICE.

GUSTAVE DUBELLÉ, OF BOSTON, MASSACHUSETTS.

IMPROVED COMPOSITION FOR PAVEMENTS.

Specification forming part of Letters Patent No. 84,272, dated November 24, 1868.

*To all persons to whom these presents may come:*

Be it known that I, GUSTAVE DUBELLÉ, of Boston, in the county of Suffolk and State of Massachusetts, manufacturing and consulting chemist, have invented a new and useful Composition for Pavements or other purposes in the arts; and I hereby declare the same, the constituents thereof, and the manner of compounding them to be described as follows:

The constituents of the said composition and the proportions of each are thirty pounds of asphaltum, seven pounds of coal-tar, two pounds of yellow wax, forty-five pounds of iron slag, thirty pounds of sand or silica, twenty-five pounds of caustic lime, eleven pounds of powdered, burnt, or baked clay, and eleven pounds of anthracite-coal ashes. The whole, when incorporated, makes about one hundred and sixty-one pounds of the composition.

To effect the incorporation of these ingredients, I put into a kettle the asphaltum, the coal-tar, and the wax, and melt them and stir them together, after which I successively introduce into the liquid mass the other ingredients, and stir the whole well, so as to thoroughly combine or intermix all of the constituents. While in a heated state the composition is to be spread on the surface on which it is to be employed. As it may cool, it will become set or hard, like stone.

I am aware that in the cement-roofing composition described in the United States Patent No. 73,645 asphaltum, coal-tar, sand, lime, and ashes have been mixed with Rosendale cement, gravel, sandstone, and rosin, there being eight parts of the cement to one of each of the others. Therefore I make no claim to such a mixture or composition.

In making my composition I do not employ Rosendale cement, nor gravel, nor sandstone, nor rosin; but I use, with other constituents above named, three others, each of which is entirely different in character and effects from either Rosendale cement, gravel, sandstone, or rosin—that is to say, I employ yellow wax, iron slag, and burnt brick or clay—and it is the combination of these with asphaltum, coal-tar, sand, lime, and anthracite-coal ashes that constitutes my composition or invention.

It should be observed that one-half of the roofing composition described in the said patent is Rosendale cement, and each other ingredient occupies but one-sixteenth of the mass, whereas I use, in making my composition, about three times as much of the asphaltum, about three times the quantity of sand, and about two times the quantity of lime. The amount of iron slag that I use is to the gravel as used in the patent roofing composition as about four to one, and the amount of burnt clay used by me is to the amount of Rosendale cement used in the patented roofing composition as about one to eight.

It will therefore be seen that I not only employ different ingredients in my composition, but use greatly-differing proportions of those which are common to the two compositions, the basis of the patented composition being Rosendale cement. The iron slag and burnt clay certainly are not equivalents for Rosendale cement, gravel, and sandstone. So the yellow wax is by no means an equivalent for rosin, the two differing as much from each other as do the slag and burnt clay from the cement or hydraulic lime, gravel, and sandstone.

I therefore claim—

The new pavement composition as made of the several materials, and in the manner as herein first described.

GUSTAVE DUBELLÉ.

Witnesses:
R. H. EDDY,
F. P. HALE, Jr.